United States Patent [19]
Neuman

[11] Patent Number: 5,524,741
[45] Date of Patent: Jun. 11, 1996

[54] GRADUAL ENGAGEMENT ONE-WAY CLUTCHES

[76] Inventor: Eli Neuman, 6 Massada Street, Magdiel, Israel, 45294

[21] Appl. No.: 173,776

[22] Filed: Dec. 27, 1993

[51] Int. Cl.[6] .............................. F16D 41/00; F16D 25/00
[52] U.S. Cl. ..................... 192/41 R; 192/58.3; 192/58.4; 192/109 D
[58] Field of Search ................... 192/41 R, 58 R, 192/58 A, 109 F, 109 D

[56] References Cited

U.S. PATENT DOCUMENTS

| | | | |
|---|---|---|---|
| 2,144,089 | 1/1939 | Stageberg | 192/58 R |
| 2,172,089 | 9/1939 | Peone | 192/58 R X |
| 2,242,734 | 5/1941 | Whittlesey | 192/58 R |
| 3,184,022 | 5/1965 | Olson | 192/58 R |

Primary Examiner—Andrea L. Pitts
Attorney, Agent, or Firm—Thomas I. Rozsa; Tony D. Chen

[57] ABSTRACT

The present invention includes new types of one-way clutches that can gradually and smoothly engage the load. The novel design of the present invention permits a multiplicity of several embodiments which includes a hydraulic one-way clutch (H.O.W.C.) and a damped one-way clutch (D.O.W.C.). The H.O.W.C. has a general configuration similar to a fluid rotary actuator. It has two or more collapsible vanes which are made to rotate about a pivot between a radial driving position and a collapsed position, in which the collapsible vanes are either partly or fully pushed away from the driving position. A body of fluid is filled between a rotor's vane and the two collapsible vanes to provide the desired damping effect. The D.O.W.C. utilizes an additional ring which is an actuating ring and is placed on an external ring with a bearing between the actuating ring and the external ring so that it can rotate around the external ring. The external ring and the actuating ring are linked together through radial extensions and a fluid cylinder between them. Each engagement cycle begins with the external ring being pushed by the actuating ring. To start the transfer of the full torque, the fluid has to be first compressed which provides for the gradual build-up in the torque.

20 Claims, 3 Drawing Sheets

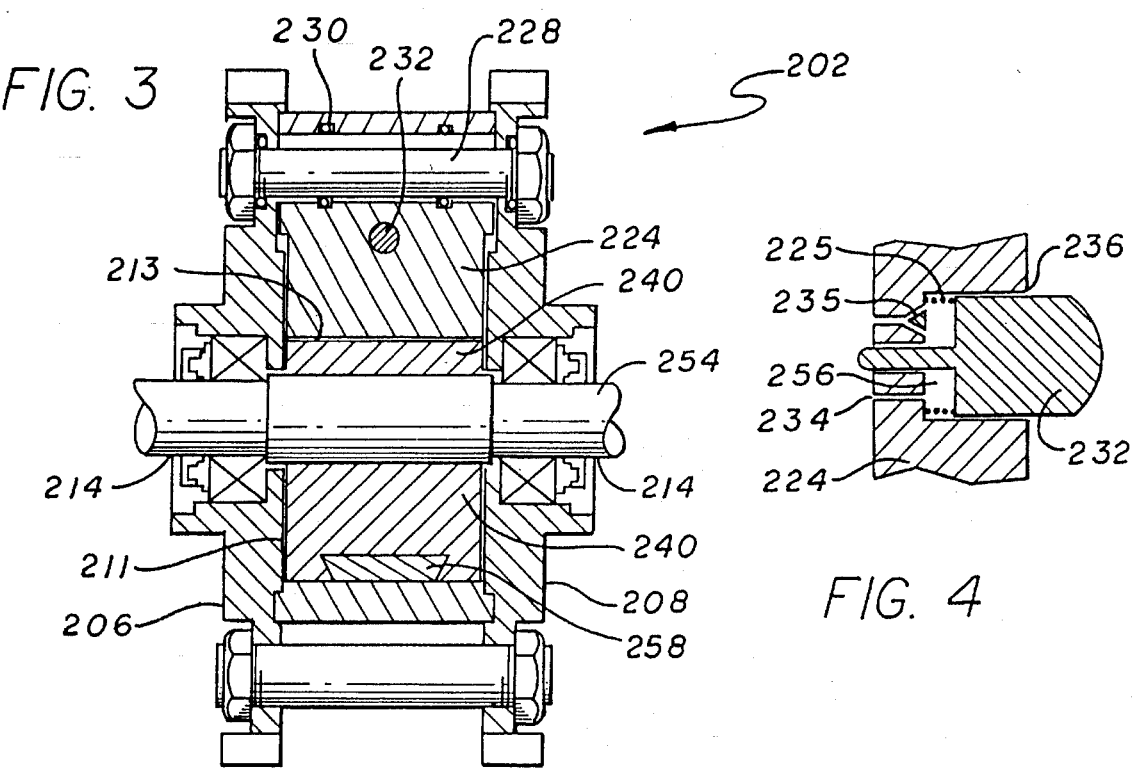
FIG. 3
FIG. 4
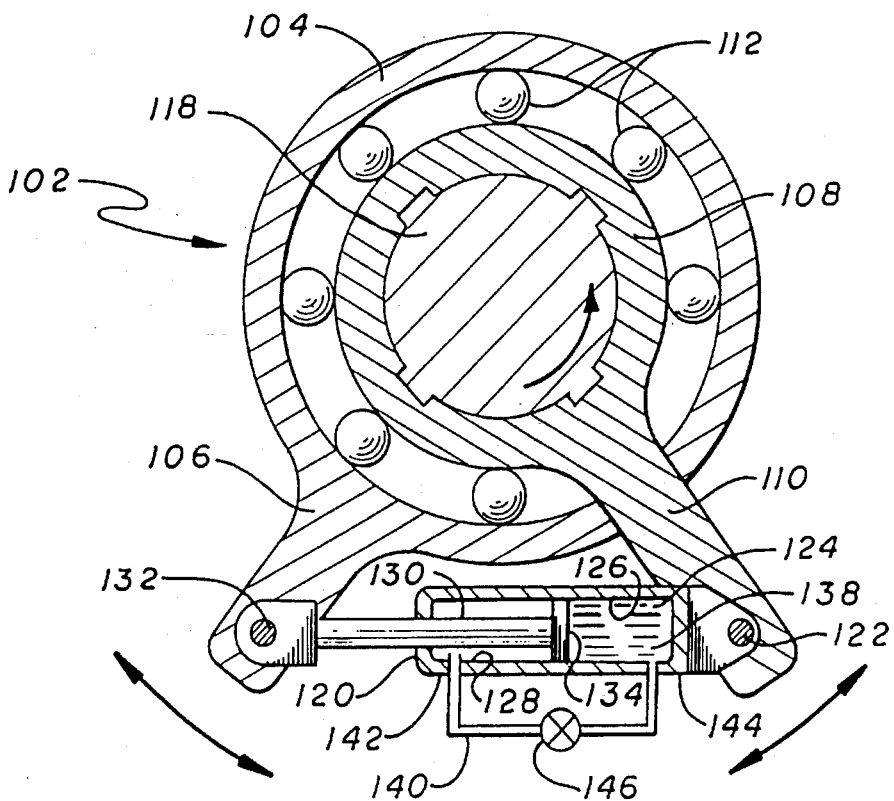
FIG. 5

GRADUAL ENGAGEMENT ONE-WAY CLUTCHES

BACKGROUND OF THE INVENTION

1. Field of the Invention

The present invention relates to one-way clutches, known also as over-running clutches.

2. Description of the Prior Art

One-way clutches ("O.W.C.") are common mechanical devices and are used in many applications. Usually, these devices utilize "wedging" action of free rolling components, which are themselves placed between two rings concentrically located. The wedging actions occurs only in a specific direction movement, which results in both rings being locked together and torque then being transferred. In the other direction, the wedging is reversed and the locking released. Such wedging can be achieved by inclined surfaces built into one of the rings.

Whether utilizing that approach or any other, all known O.W.C.'s reach engagement through metal-to-metal contact, which is harsh and stressful. In most applications, that presents little or no problem. However, other applications which cannot tolerate sudden and harsh clutch engagement do exist. One of such applications is "variable stroke" transmissions, also known as impulse and inertia drives. In these drives, the O.W.C. has to go through one cycle of engagement and disengagement for every single revolution of the input shaft. This is a very high frequency or repetitive impact loading of the clutch, and naturally it cannot survive in demanding environments like automobiles, etc.

Therefore, it is highly desirable to have an efficient and effective design of a new and improved O.W.C. which can engage the load gradually and smoothly so that impact loading is avoided.

SUMMARY OF THE INVENTION

The present invention is a new one way clutch O.W.C. which can engage the load gradually and smoothly. The novel design of the present invention permits a multiplicity of several embodiments which includes a hydraulic O.W.C. (H.O.W.C.) and a damped O.W.C. (D.O.W.C.). The H.O.W.C. has a general configuration similar to a fluid rotary actuator.

It has been discovered, according to the present invention, that if a H.O.W.C. is utilized with a body of fluid, in which the body of fluid can be filled between collapsible vanes and an extended rotor vane, then the H.O.W.C. will provide the desired damping effect on two or more collapsible vanes which are made to rotate about a pivot between a radially deployed driving position and a collapsed position. Therefore, it is an important object of the present invention to provide a O.W.C., in which the metal-to-metal contact is done under no-load conditions and the transferred torque is built up gradually.

Although the fluid compressibility is very small, it is sufficient to create the gradual rise in pressure. The compressibility is irreversible, meaning that energy is dissipated which contributes to the damping effect. The rest of the compressibility acts like a spring, and energy is recoverable.

It has also been discovered, according to the present invention, that if additional damping means are required in the H.O.W.C., then dashpot external means can be provided by the H.O.W.C. Therefore, it is another object of the present invention to provide a H.O.W.C. with spring returned dashpots. These dashpots restrict the fluid flow in one direction thus slowing the deployment of the collapsible vanes and in doing so provide more damping.

It has additionally been discovered, according to the present invention, that by adding an actuating ring on a conventional O.W.C., in which an actuating ring is placed on the external ring with a bearing between the actuating ring and the external ring, the actuating ring can freely rotate around the external ring. Therefore, it is an additional object of the present invention to provide a D.O.W.C. with an actuating ring such that the external ring and the actuating ring are linked together through radial extensions with a fluid filled cylinder between them so that each engagement cycle begins with the external ring being pushed counter-clockwise by the actuating ring. To start the transfer of the full torque, the fluid has to first be compressed, and this provides for the gradual build-up in the torque.

It has further been discovered, according to the present invention, that if a piston and a fluid filled cylinder are utilized in the D.O.W.C. with a by-pass passage and a control valve in line with the by-pass passage, then it will provide a way to control the damping effect on the D.O.W.C. Therefore, it is a further object of the present invention to provide a D.O.W.C. with a by-pass passage connected to the cylinder ends, and a control valve between the by-pass passage. With this mechanism, the transfer of forces and torques are rendered totally dependent on the control valve position, and the damping is achieved by both fluid compressibility and way of the opening and closing of the control valve. The fluid filled cylinder is acted upon by a force in one end, and will not transfer the force to the rod end if the fluid flow is free. If the flow is completely blocked, the piston and fluid filled cylinder act like a rigid body and forces are transmitted.

Therefore, the primary object of the present invention is to provide a O.W.C. which engages the load gradually and smoothly so that the sudden metal-to-metal contact, as well as the shocks and vibrations imparted to all the members in the drive chain, are eliminated. In the preferred embodiment, the present invention is a H.O.W.C. which can gradually and smoothly engage the load. In an alternative embodiment, the present invention is a D.O.W.C. which utilizes a conventional O.W.C. and an additional actuating ring, and can also gradually and smoothly engage the load.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a partial cross-sectional view of the H.O.W.C. taken along line 3—3 of FIG. 2.

FIG. 4 is an enlarged cross-sectional view of a partially cut-out portion of a small piston which is biased by a small spring.

FIG. 5 is a front cross-sectional view of a simplified illustration of an embodiment of a D.O.W.C.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
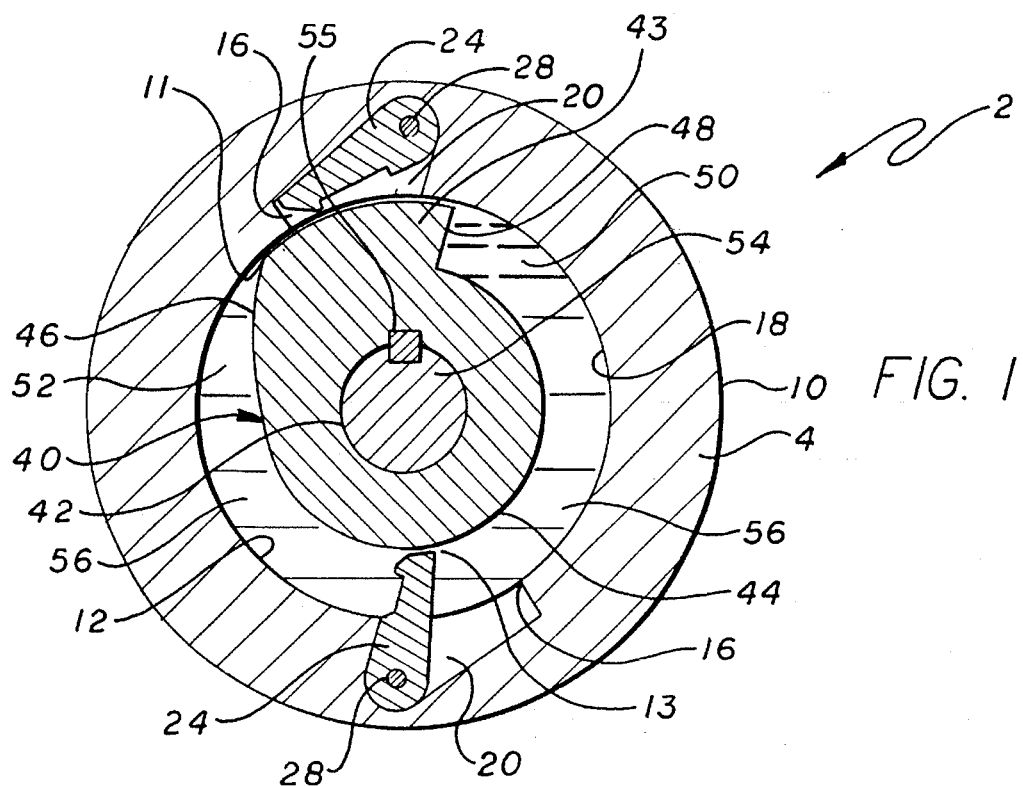
FIG. 1 is a front cross-sectional view of a simplified illustration of the preferred embodiment of the present invention H.O.W.C.

Referring to FIG. 1, there is shown at 2 a simplified illustration of the present invention H.O.W.C. which has a generally cylindrical shaped casing or ring member 4. The H.O.W.C. 2 has a general configuration similar to that of a hydraulic rotary actuator. The circumferential sidewall 10 has an inner surface 18 with two or more sunken cavities 20 which are located opposite to each other. Each cavity 20 has an opening 16 which opens into the interior chamber 12.

A spring biased collapsible vane 24 is respectively disposed in each of the two cavities 20 of the circumferential sidewall 10. Each collapsible vane 24 is pivotally mounted within the cavity 20 of the circumferential sidewall 10 and mounted by a connecting bolt 28 such that each collapsible vane 24 can extend into the interior chamber 12 of the cylindrical shaped casing 4.

A generally cylindrical shaped rotor member 40 is disposed into the interior chamber 12 of the cylindrical shaped casing 4. The rotor member 40 has a central opening 42 and an extended rotor vane 43 which has a substantially wide angle which can completely overlap the opening 16 of one of the two cavities 20. The extended rotor vane 43 extends toward the inner surface 18 of the circumferential sidewall 10 and forms a narrow clearance 11 therebetween. The rotor member 40 further has a smaller diameter portion 44 and a larger diameter portion 46 with an engagement surface 48. When one of the two collapsible vanes 24 extends into the interior chamber 12 and almost touches the small diameter portion 44 of the rotor member 40, which creates a small clearance therebetween, that particular collapsible vane 24 divides the interior chamber 12 into two separate chambers, a first fluid chamber 50 and a second fluid chamber 52. The collapsible vane 24 also forms another narrow clearance 13 between the collapsible vane 24 and the rotor member 40.

A partial retraction occurs when the rotor member 40 in part of its reciprocation momentarily moves counterclockwise relative to the body. A full retraction occurs when the extended rotor vane 43 passes across one of the collapsible vanes 24.

The rotor member 40, when in its reciprocation moves clockwise relative to the body, creates liquid flow that together with the spring force at least one of the collapsible vanes 24 to fully deploy in radial direction and thus to seal the flow and separate the chambers 50 and 52. Continuing the movement, the pressure in chamber 50 rises and drives the collapsible vane 24 and the body with it. There is no contact between the smaller diameter portion 44 of the rotor vane 43 and the collapsible vane 24. However, when the rotor 40 moves counterclockwise relative to the body, the flow opens the passage by flushing the collapsible vane 24 against spring force, thus no torque is transferred.

A rotating shaft 54 is connected to the cylindrical shaped rotor member 40 by a fastener means 55. The rotor member 40 is a free rotating part which can engage with either one of the two collapsible vanes 24.

A body of fluid 56 is utilized for providing both the transfer of torque and a desired damping effect. The body of fluid 56 can be water or viscous fluid or any type of fluid. The body of fluid 56 is filled into both the first fluid chamber 50 and the second fluid chamber 52, and between the extended rotor vane 43 and the collapsible vanes 24. When the rotor member 40 begins its driving, or clockwise movement, one of the two collapsible vanes 24 starts to deploy until it arrives at a stop, close to a radial position. Once the collapsible vane 24 has fully deployed, chamber 50 is sealed off, and the pressure builds up between the extended rotor vane 43 and the respective one of the two collapsible vanes 24, and thereby the H.O.W.C. starts to deliver torque.

The essential point to understand here is that although metal-to-metal stops are used (engagement surface 48 of the rotor member 40 contacts one of the C-vanes 24) the metal-to-metal contact is done under no-load conditions, and the torque is transferred by the fluid pressure which is built up gradually.

Figure 2:
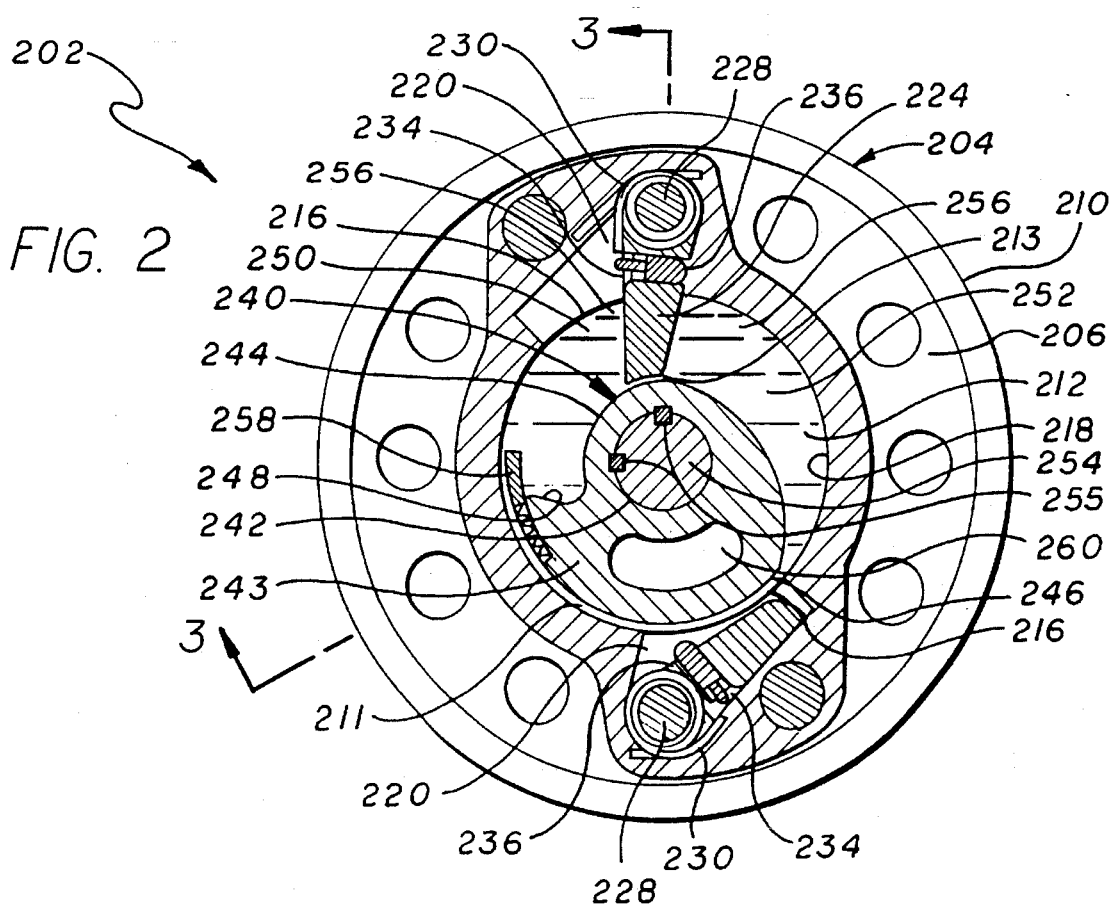
FIG. 2 is a partially cut-out front cross-sectional view of a detailed illustration of the H.O.W.C.

Referring to FIGS. 2 and 3, there is shown at 202 a detailed illustration of the present invention H.O.W.C. 202. Since it functions the same as previously described above except the H.O.W.C. 202 includes additional options shown in FIGS. 2, 3 and 4, the parts are numbered correspondingly with 200 added to each number. The principles of this detailed illustration in FIGS. 2 and 3 are the same as those described above for the simplified illustration in FIG. 1, and will not be repeated.

The cylindrical shaped casing 204 includes a front cover 206, a rear cover 208, a circumferential sidewall 210 and an interior chamber 212. Each cover has a central opening 214 therethrough. The circumferential sidewall 210 has an inner surface 218 with two cavities 220 which are located opposite to each other. Each cavity 220 has an opening 216 which opens into the interior chamber 212.

Two spring biased collapsible vanes 224 are respectively disposed into the two cavities 220 of the circumferential sidewall 210. Each collapsible vane 224 is pivotally mounted within the cavity 220 of the circumferential sidewall 210 and mounted by a connecting bolt 228 and biased by a spring 230 such that each collapsible vane 224 can extend into the interior chamber 212 of the cylindrical shaped casing 204.

A generally cylindrical shaped rotor member 240 is disposed into the interior chamber 212 of the cylindrical shaped casing 204. The rotor member 240 has a central opening 242 and an extended rotor vane 243 which has a substantially wide angle which can completely overlap the opening 216 of one of the two cavities 220. The extended rotor vane 243 extends toward the inner surface 218 of the circumferential sidewall 210 and forms a narrow clearance 211 therebetween. The rotor member 240 further has a smaller diameter portion 244 and a larger diameter portion 246 with a surface 248. When one of the two collapsible vanes 224 extends into the interior chamber 212 and almost touches the smaller diameter portion 244 of the rotor member 240, that particular collapsible vane 224 divides the interior chamber 212 into two separate chambers, a first fluid chamber 250 and a second fluid chamber 252. The collapsible vane 224 also forms another narrow clearance 213 between the collapsible vane 224 and the rotor member 240.

Referring to FIG. 3, there is shown a rotating shaft 254 which is rotatably mounted through the respective openings 21.4 of the front cover 206 and the rear cover 208 of the cylindrical shaped casing 204. The cylindrically shaped rotor member 240 is mounted to the rotating shaft 254 by fastening means 255 between the front cover 206 and the rear cover 208. All of the central openings 214 and 242 of the front and rear covers 206, 208 and the rotor member 240 are aligned together respectively, and the rotating shaft 254 is inserted therethrough. The rotor member 240 is a free rotating part.

A body of fluid 256 is utilized both for serving as a driving medium and for providing a desired damping effect. The body of fluid 256 can be water or any type of fluid. The body of fluid 256 is filled into both the first fluid chamber 250 and the second fluid chamber 252, and between the extended rotor vane 243 and the two collapsible vanes 224. The two narrow clearances 211 and 213 are preferably as small as economically achievable because undesirable internal leakage flows through them.

Referring to FIGS. 2 and 4, there are shown two small spring biased pistons 232 which are optional for providing additional damping effect on the H.O.W.C. 202. Each spring biased piston 232 is mounted to the respective one of the two collapsible vanes 224, as shown in FIG. 4. Each collapsible vane 224 is provided with an opening 236, in which the piston 232 is disposed and biased by a small spring 225. There is also a small narrow passage 234 and a one-way valve arrangement 235 on each of the collapsible vane 224 for allowing in one-way, and restricting in the other way, the body of fluid 256 to flow into or out of the opening 236. In the restricted direction, the liquid provides a damping effect to the piston 232.

Referring to FIGS. 2 and 3, a spring loaded slide 258 is also optional on the H.O.W.C. 202. The spring loaded slide 258 is attached to the extended rotor vane 243 of the rotor 240 and is located adjacent to the inner surface 218 of the circumferential sidewall 210. The spring loaded slide 258 is utilized for preventing a respective one of the two collapsible vanes 224 from hitting the rotor member 240 when the rotor 240 begins its forward movement or clockwise movement. Such a situation has a low probability, and if it does happen, the worst case is that the H.O.W.C. 202 will function once, as a ratchet. However, to achieve highest possible reliability the spring loaded slide 258 can be added and thereby ratcheting is completely eliminated. A balancing means 260 is also optional and is provided on the H.O.W.C. 202 for balancing the rotor 240. The balancing means 260 is a large opening located on the larger diameter portion 246 of the rotor 240.

The invention described above provided an effective means for providing a gradual engagement of the H.O.W.C. It is noted, however, that a simple reversed design can also provide a practical implementation of the present invention H.O.W.C. For example, in the illustration shown in FIG. 1, the two collapsible vanes can be disposed into cavities located in the rotor, while the fixed extended vane can be part of the inner surface of the cylindrical shaped casing of the H.O.W.C. In other words, there is a simple reversal of the locations of the collapsible vanes and the fixed vane. This reversed system works equally well as the embodiment illustrated in FIGS. 1 through 4.

Referring to FIG. 5, there is shown a simplified illustration of an embodiment of a D.O.W.C. 102. The D.O.W.C. 102 has an external driving ring 104 which has an elongated arm 106 extending in a radial direction, and an internal driven ring 108 which also has an elongated arm 110 extending in a radial direction. A free rotating circular bearing assembly, which may include ball bearings 112, is placed between the driving ring 104 and the driven ring 108 such that the driving ring 104 can rotate freely around the driven ring 108. The driven ring 108 is coupled with an output shaft 118 for outputting the rotation.

The D.O.W.C. 102 utilizes a fluid filled piston cylinder 120 which has a mounting end 122 and an interior chamber 124. The mounting end 122 of the fluid filled piston cylinder 120 is connected to the elongated arm 110 of the driven ring 108. An elongated piston rod 130 is assembled with the fluid filled piston cylinder 120, and has a mounting end 132 and an opposite piston 134. The mounting end 132 is connected to the elongated arm 106 of the driving ring 104. The piston 134 is placed into the interior chamber 124 of the fluid filled piston cylinder 120 and separates the interior chamber 124 into a first fluid chamber 126 and a second fluid chamber 128. A body of fluid 138 is filled into the first and second fluid chambers 126 and 128. The body of fluid 138 can be any suitable fluid, or may be just air. In the preferred embodiment, the body of fluid 138 is low viscosity fluid such as water.

The fluid flow between the first and second fluid chamber is controlled by a control valve arrangement. The principle of the control valve arrangement is illustrated by the by-pass passage 140 shown in FIG. 5. The by-pass passage 140 has a first end 144 which is connected to the first fluid chamber 126, and a second end 142 connected to the second fluid chamber 128 for allowing and restricting the body of fluid 138 to flow freely between fluid chambers 126 and 128. A control valve 146 is disposed within the by-pass passage 140 for controlling the opening and closing of the by-pass passage 140, and therefore allowing and restricting the flow of fluid 138.

The operation of the foregoing embodiment will now be described. The fluid filled piston cylinder 120 will not transfer the force to arm 110 if the fluid 138 flow is free. If the flow is completely blocked, the piston rod 130 and the fluid filled piston cylinder 120 act like a rigid body and forces are transmitted. By having the by-pass passage 140 connected between the two fluid chambers 126 and 128, and the control valve 146 between the by-pass passage 140, the transfer of forces and torques are rendered totally dependent on the valve position. This affords a flexible design. The control valve 146 may be a simple "check" or "one-way" valve, or it can be controlled through mechanical or electronics devices.

Figure 6:
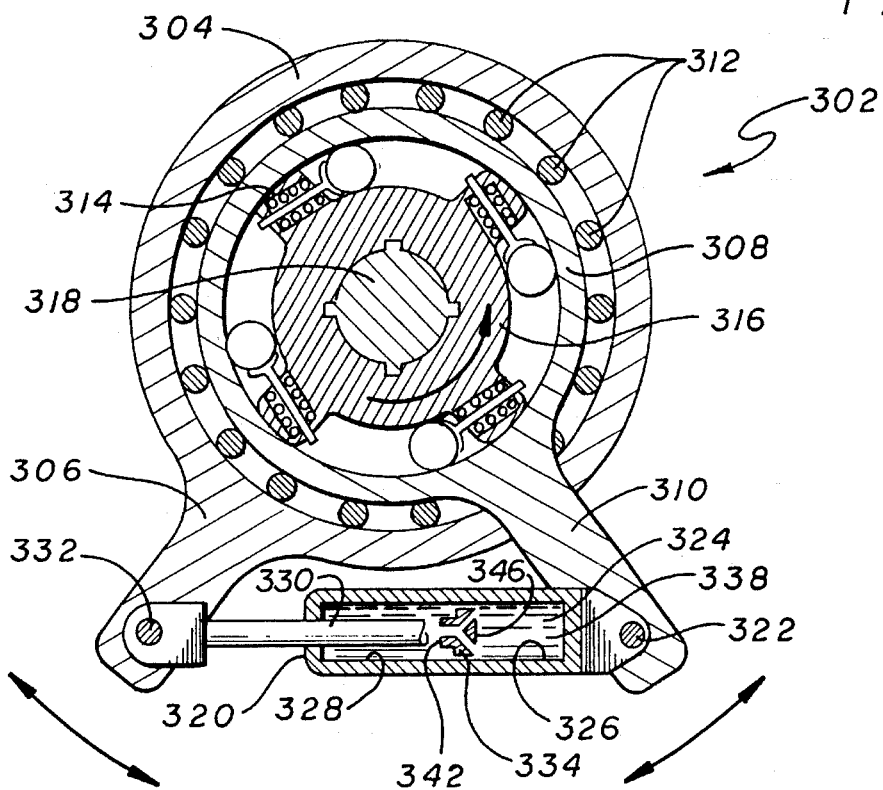
FIG. 6 is a front cross-sectional view of a detailed illustration of an alternative embodiment of the D.O.W.C.

Referring to FIG. 6, there is shown an illustration of an alternative implementation 302 of the embodiment of the D.O.W.C.. The D.O.W.C. 302 has a driving ring 304 which has an elongated arm 306 extending in a radial direction, an outer or driven ring 308 which also has an elongated arm 310 extending in a radial direction, and an inner ring 316 which is coupled with an output shaft 318. A free rotating circular bearing assembly, which may include ball bearings 312, is placed between the driving ring 304 and the outer ring 308 such that the driving ring 304 can rotate freely around the outer ring 308. A typical one-way roller arrangement 314 is assembled between the outer ring 308 and the inner ring 316 for transferring one-way rotation.

The D.O.W.C. 302 utilizes a fluid filled piston cylinder 320 which has a mounting end 322 and an interior chamber 324. The mounting end 322 of the fluid filled piston cylinder 320 is connected to the elongated arm 310 of the outer ring 308. An elongated piston rod 330 is assembled with the fluid filled piston cylinder 320, and has a mounting end 332 and a piston 334 at the opposite end. The mounting end 332 is connected to the elongated arm 306 of the driving ring 304. The piston 334 is disposed in the interior chamber 324 and biased by a spring 336, and separates the interior chamber 324 into a first fluid chamber 326 and a second fluid chamber 328. A body of fluid 338 is filled into the first and second fluid chambers 326 and 328. Again, the body of fluid 338 may be a fluid such as water, or any other suitable fluid. The clearance 19 between the piston 334 and the interior sidewall of the piston cylinder 320 is made deliberately large. Furthermore, a one-way valve 346 is built-in the piston 334. The one-way valve 346 is connected to an internal conduit 342 in the shaft of the piston rod 330.

When the driving ring 304 is moving counterclockwisely, its arm 306 pushes the piston rod 330 to the right. Spring 336 transfers light forces to outer ring 308 to engage or "lock-on" the one-way roller mechanism 314. This action takes some small angular movement of the driving ring 304 relative to the outer ring 308. Once the one-way roller mechanism 314 is fully engaged or "locked", the output loads will resist further movement in counterclockwise direction. As the driving ring 304 continues to move counterclockwisely, and the piston rod 330 moves to the right, the one-way valve 346 is forced shut and the fluid flows through the large clearance between the piston 334 and piston cylinder 320, which offers low resistance to fluid flow. Therefore, the forces transferred to cylinder 320 are still low. As the piston rod 330 gets closer to the bottom of the cylinder 320, fluid resistance increase exponentially and torque starts to build-up. When piston rod 330 reaches the bottom, full torque is transferred.

In the return phase, driving ring 304 moves in clockwise, and spring 336 pushes piston rod 330 away. The one-way valve 346 opens to allow the fluid flow from the first fluid chamber 326 to the second fluid chamber 328. However, the resistance of the fluid in the first fluid chamber 326 is enough to "drag" the arm 310 of the outer ring 308 clockwisely, thus disengaging or unlocking the one-way roller assembly 314.

Figure 7:
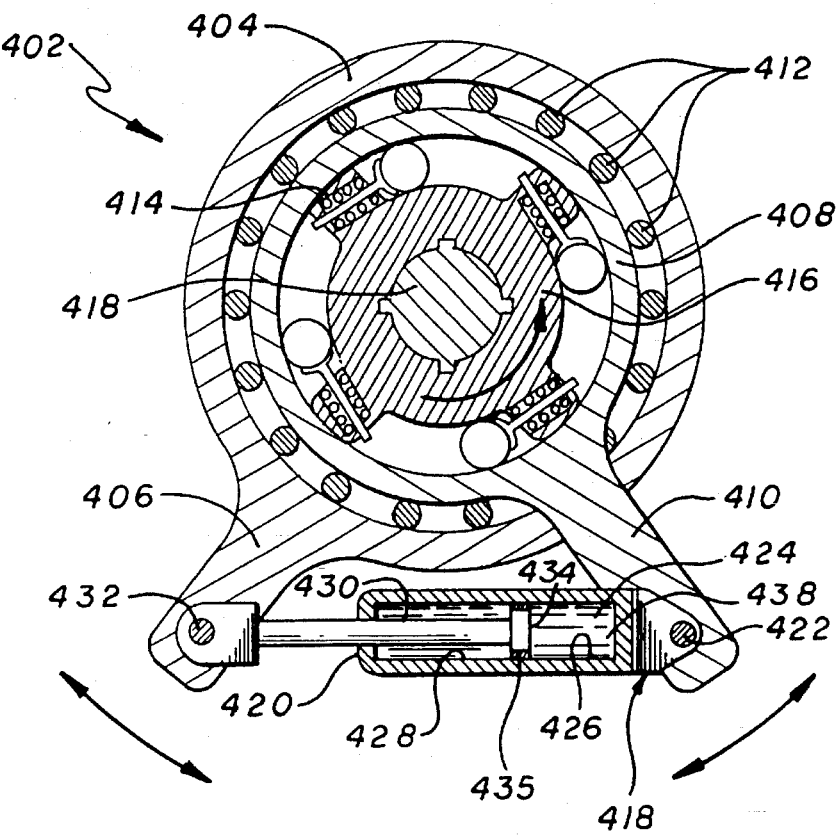
FIG. 7 is a front cross-sectional view of a detailed illustration of another alternative embodiment of the D.O.W.C.

Referring to FIG. 7, there is shown an illustration of another alternative embodiment 402 of the D.O.W.C.. Similar to the embodiment shown in FIG. 6, the D.O.W.C. 402 has a driving ring 404 which has an elongated arm 406 extending in a radial direction, an outer or driven ring 408 which also has an elongated arm 410 extending in a radial direction, and an inner ring 416 which is coupled with an output shaft 418. A free rotating circular bearing assembly, which may include ball bearings 412, is placed between the driving ring 404 and the outer ring 408 such that the driving ring 404 can rotate freely around the outer ring 408. Again, a typical one-way roller arrangement 414 is assembled between the outer ring 408 and the inner ring 416 for transferring one-way rotation.

The D.O.W.C. 402 utilizes a piston cylinder 420 which has a mounting end 422 and an interior chamber 424. The mounting end 422 of the piston cylinder 420 is connected to the elongated arm 410 of the outer ring 408. An elongated piston rod 430 is assembled with the piston cylinder 420, and has a mounting end 432 and a piston 434 at the opposite end. The mounting end 432 is connected to the elongated arm 406 of the driving ring 404. The piston 434 is disposed in the interior chamber 424 and has an air-tight seal 435, and separates the interior chamber 424 into a first fluid chamber 426 and a second fluid chamber 428. A body of air 438 is filled into the first and second fluid chambers 426 and 428.

In this embodiment, the cylinder 420 is airtight, and the first fluid chamber 426 is sealed by the piston 434 and its seal 435. When the piston rod 430 moves to the right, the air starts to compress. Initial forces are low and lock the one-way roller assembly 414. Thereafter the pressure builds-up till full torque is reached. This is possible even without the piston rod 430 touching the bottom of cylinder 420, therefore avoiding metal-to-metal contact. On the way back, the pressure pushes the piston rod 430 away. However, when it reaches the other side of the cylinder 420, the piston rod 430 drags the cylinder 420 to unlock the one-way roller assembly 414.

Defined in detail, the present invention is a hydraulic one-way clutch, comprising: (a) a generally cylindrical shaped casing having a front cover, a rear cover and a cylindrical sidewall which define an interior chamber, the front and rear covers each having a central opening, and the cylindrical sidewall having an inner surface with two opposite cavities each having an opening which opens into the interior chamber; (b) means for mounting the front and rear covers to the cylindrical sidewall; (c) two spring biased collapsible vanes each disposed into a respective one of the two cavities, each collapsible vane being pivotally mounted by a connecting bolt and biased by a spring to deploy into the interior chamber; (d) each the collapsible vane further having a small dashpot damping means; (e) a rotor disposed in the interior chamber and having a central opening and an extended rotor vane, the rotor vane having a substantially wide angle which can completely overlap one of the openings of the two cavities, the extended rotor vane extending towards the inner surface of the cylindrical sidewall and forming a narrow clearance therebetween; (f) the rotor further having a smaller diameter portion and a larger diameter portion with an engagement surface, such that when one of the two collapsible vanes extends into the interior chamber, it creates a small clearance between itself and the smaller diameter portion of the rotor and thereby forms a first fluid chamber between the engagement surface of the rotor and a deployed collapsible vane, and a second fluid chamber; (g) means for balancing the rotor; (h) means for cushioning engagement between the engagement surface of the rotor and the deployed one of the two collapsible vanes; (i) a rotating shaft rotatably connected to the front and rear covers of the casing for rotatably mounting the rotor in the chamber; and (j) a body of fluid filled into the first and second fluid chambers; (k) whereby when the rotor rotates in one direction such that the vane of the rotor is moving towards the deployed collapsible vane, the fluid in the first fluid chamber creates a hydraulic pressure that transfers torque and also a hydraulic damping effect which allows a gradual delivery of torque by the one-way clutch.

Defined broadly, the present invention is a hydraulic one-way clutch, comprising: (a) a generally cylindrical shaped ring having an interior surface which define an interior chamber, the inner surface having at least one cavity which opens into the interior chamber; (b) at least one collapsible vane pivotally mounted in the cavity, such that it can deploy into the interior chamber; (c) a rotor disposed in the interior chamber and having an extended rotor vane, the extended rotor vane conforming with the inner surface of the cylindrical ring; (d) the rotor further having a smaller diameter portion and a larger diameter portion with an engagement surface, such that when the at least one collapsible vane deploys into the interior chamber, it creates a small clearance between itself and the smaller diameter portion of the rotor, and thereby forms a first fluid chamber between the engagement surface of the rotor and the at least one collapsible vane, and a second fluid chamber; and (e) a body of fluid filled into the first and second fluid chambers; (f) whereby when the rotor rotates in one direction such that the vane of the rotor is moving towards the at least one collapsible vane, the fluid in the first fluid chamber creates a pressure which transfers torque and also a damping effect which allows a gradual delivery of torque by the one-way clutch.

Alternatively defined broadly, the present invention is a hydraulic one-way clutch, comprising: (a) a generally cylindrical shaped ring having an inner surface which define an interior chamber, the inner surface having an extended vane; (b) a rotor disposed in the interior chamber and having an outer surface, the outer surface having at least one sunken cavity which opens into the interior chamber, and the extended vane of the ring reaching close to the outer surface of the rotor; (c) at least one collapsible vane pivotally mounted in the cavity, such that it can deploy into the interior chamber; (d) the inner surface of the ring further having a smaller diameter portion and a larger diameter portion, such that when the at least one collapsible vane deploys into the interior chamber, it creates a small clearance between itself and the smaller diameter portion of the ring, and thereby forms a first fluid chamber between the extended vane and the at least one collapsible vane, and a second fluid chamber; and (e) a body of fluid filled into the first and second fluid chambers; (f) whereby when the ring rotates in one direction such that the extended vane is moving towards the at least one collapsible vane, the fluid in the first fluid chamber creates a pressure which transfers torque and also a damping effect which allows a gradual delivery of torque by the one-way clutch.

Defined alternatively in detail, the present invention is a damped one-way clutch, comprising: (a) a circular driving ring having an arm extending in a radial direction; (b) a circular outer ring having an arm extending in a radial direction; (c) means disposed between the driving ring and the outer ring which allows them to rotate freely relative to one other; (d) a circular inner ring; (e) a one-way engagement mechanism assembled between the circular outer ring and the circular inner ring; (f) an output shafted coupled with the inner ring; (g) a piston cylinder having an interior chamber and a bottom end connected to the arm of the outer ring; (h) a piston rod having a piston sliding inside the interior chamber of the piston cylinder, and an opposite end connected to the arm of the driving ring, the piston forming a first fluid chamber between itself and the bottom end of the piston cylinder and a second fluid chamber, the piston maintaining a clearance between itself and an interior surface of the piston cylinder; (i) means for biasing the piston rod away from the bottom end of the piston cylinder; (0) a body of fluid filled into the first and second fluid chambers; (k) a fluid passage built into the piston rod for interconnecting the first and second fluid chambers; (1) a control valve built into the piston for controlling fluid flow through the fluid passage; and (m) means for controlling the control valve; (n) whereby when the driving ring rotates in one direction such that the piston moves towards the bottom end of the piston cylinder, the fluid in the first fluid chamber creates a hydraulic damping effect which allows a gradual delivery of torque by the one-way clutch, and when the driving ring rotates in an opposite direction such that the piston moves away from the bottom end of the piston cylinder, the control valve can be opened to allow fluid to flow from the second fluid chamber to the first fluid chamber which allows a disengagement of the one-way clutch.

Also defined alternatively in detail, the present invention is a damped one-way clutch, comprising: (a) a circular driving ring having an arm extending in a radial direction; (b) a circular outer ring having an arm extending in a radial direction; (c) means disposed between the driving ring and the outer ring which allows them to rotate freely relative to one other; (d) a circular inner ring; (e) a one-way engagement mechanism assembled between the circular outer ring and the circular inner ring; (f) an output shafted coupled with the inner ring; (g) an air-tight piston cylinder having an interior chamber and a bottom end connected the arm of the outer ring; (h) a piston rod having a piston sliding inside the interior chamber of the piston cylinder, and an opposite end connected to the arm of the driving ring, the piston forming a first fluid chamber between itself and the bottom end of the piston cylinder and a second fluid chamber, the piston being air-tight and sealing the first fluid chamber from the second fluid chamber; and (i) a body of fluid filled into the first and second fluid chambers; (j) whereby when the driving ring rotates in one direction such that the piston moves towards the bottom end of the piston cylinder, the fluid in the first fluid chamber compresses gradually which allows a gradual delivery of torque by the one-way clutch, and when the driving ring rotates in an opposite direction the engagement is released.

Defined alternatively and broadly, the present invention is a damped one-way clutch for use in inertial and impulse drives, comprising: (a) a circular driving ring having an arm extending in a radial direction; (b) a circular driven ring having an arm extending in a radial direction; (c) means disposed between the driving ring and the driven ring which allows them to rotate freely relative to one other; (d) an output shafted coupled with the inner ring; (e) a dashpot having one end connected to the arm of the driving ring and an opposite end connected to the arm of the driven ring, the dashpot including a piston cylinder having an interior chamber and a bottom end, and a piston rod having a piston sliding inside the interior chamber of the piston cylinder, where the piston forms a first fluid chamber between itself and the bottom end of the piston cylinder and a second fluid chamber; (f) a body of fluid filled into the first and second fluid chambers; (g) a one-way fluid passage arrangement connected between the first and second fluid chamber for controlling fluid flow therebetween; (h) whereby when the driving ring rotates in one direction such that the piston moves towards the bottom end of the piston cylinder, the one-way fluid passage arrangement can be operated to allow the fluid in the first fluid chamber to create a damping effect, which renders a gradual delivery of torque by the one-way clutch, and when the driving ring rotates in an opposite direction such that the piston moves away from the bottom end of the piston cylinder, the one-way fluid passage arrangement can be operated to allow free flow and thereafter disengage the one-way clutch.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A hydraulic one-way clutch, comprising:

a) a generally cylindrical shaped casing having a front cover, a rear cover and a cylindrical sidewall which define an interior chamber, the front and rear covers each having a central opening, and the cylindrical sidewall having an inner surface with two opposite sunken cavities each having an opening which opens into the interior chamber;

b) means for mounting said front and rear covers to said cylindrical sidewall;

c) two spring biased collapsible vanes each disposed into a respective one of said two cavities, each collapsible vane being pivotally mounted by a connecting bolt and biased by a spring to deploy into said interior chamber;

d) each said collapsible vane further having a dashpot damping means;

e) a rotor disposed in said interior chamber and having a central opening and an extended rotor vane which can completely overlap one of said openings of said two cavities, the extended rotor vane extending towards said inner surface of said cylindrical sidewall and forming a narrow clearance therebetween;

f) said rotor further having a smaller diameter portion and a larger diameter portion, such that when one of said two collapsible vanes extends into said interior chamber, it creates a clearance between itself and the smaller diameter portion of said rotor, and thereby forms a first fluid chamber between said rotor vane and a deployed collapsible vane, and a second fluid chamber;

g) means for balancing said rotor;

h) means for preventing hard-contact between said rotor vane and said deployed one of said two collapsible vanes;

i) a rotating shaft rotatably connected to said front and rear covers of said cylindrical shaped casing for rotatably mounting said rotor in said interior chamber; and j) a body of fluid filled into said first and second fluid chambers;

k) whereby when said rotor rotates in one direction such that said rotor vane is moving towards said deployed collapsible vane, said fluid in said first fluid chamber creates a hydraulic pressure that transfers torque and also a hydraulic damping effect which allows a gradual delivery of torque by said one-way clutch.

2. The invention as defined in claim 1 wherein said means for mounting said front and rear covers to said cylindrical sidewall includes connecting bolts.

3. The invention as defined in claim 1 wherein said dashpot damping means of each said collapsible vane includes a spring biased piston disposed in a cavity on each said collapsible vane.

4. The invention as defined in claim 1 wherein said means for balancing said rotor includes an opening located on said larger diameter portion of said rotor.

5. The invention as defined in claim 1 wherein said means for preventing hard-contact between said rotor vane and said deployed one of said two collapsible vanes including a spring loaded slide disposed in a cavity at said rotor vane and adjacent to said inner surface of said cylindrical sidewall.

6. The invention as defined in claim 1 wherein said body of fluid is water.

7. A hydraulic one-way clutch, comprising:

a) a generally cylindrical shaped ring having an inner surface which defines an interior chamber, the inner surface having at least one sunken cavity which opens into the interior chamber;

b) at least one collapsible vane pivotally mounted in said at least one sunken cavity, such that it can deploy into said interior chamber;

c) a rotor disposed in said interior chamber and having an extended rotor vane, the extended rotor vane conforming with said inner surface of said cylindrical shaped ring;

d) said rotor further having a smaller diameter portion and a larger diameter portion, such that when said at least one collapsible vane deploys into said interior chamber, it creates a clearance between itself and the smaller diameter portion of said rotor, and thereby forms a first fluid chamber between said rotor vane and said at least one collapsible vane, and a second fluid chamber; and e) a body of fluid filled into said first and second fluid chambers;

f) whereby when said rotor rotates in one direction such that said rotor vane is moving towards said at least one collapsible vane, said fluid in said first fluid chamber creates a pressure which transfers torque and also a damping effect which allows a gradual delivery of torque by said one-way clutch.

8. The invention as defined in claim 7 further comprising a front cover and a rear cover mounted to said cylindrical shaped ring.

9. The invention as defined in claim 7 wherein said at least one collapsible vane is biased by a spring means.

10. The invention as defined in claim 7 wherein said at least one collapsible vane has a dashpot damping means.

11. The invention as defined in claim 7 further comprising means for balancing said rotor.

12. The invention as defined in claim 7 further comprising means for cushioning engagement between said rotor vane and said at least one collapsible vane.

13. The invention as defined in claim 7 wherein said body of fluid is water.

14. A hydraulic one-way clutch, comprising:

a) a generally cylindrical shaped ring having an inner surface which defines an interior chamber, the inner surface having an extended vane;

b) a rotor disposed in said interior chamber and having an outer surface, the outer surface having at least one sunken cavity which opens into the interior chamber, and said extended vane of said ring reaching close to the outer surface of the rotor;

c) at least one collapsible vane pivotally mounted in said at least one sunken cavity, such that it can deploy into said interior chamber;

d) said inner surface of said ring further having a smaller diameter portion and a larger diameter portion, such that when said at least one collapsible vane deploys into said interior chamber, it creates a clearance between itself and the smaller diameter portion of said ring, and thereby forms a first fluid chamber between said extended vane and said at least one collapsible vane, and a second fluid chamber; and e) a body of fluid filled into said first and second fluid chambers;

f) whereby when said ring rotates in one direction such that said extended vane is moving towards said at least one collapsible vane, said fluid in said first fluid chamber creates a pressure which transfers torque and also a damping effect which allows a gradual delivery of torque by said one-way clutch.

15. The invention as defined in claim 14 further comprising a front cover and a rear cover mounted to said cylindrical shaped ring.

16. The invention as defined in claim 14 wherein said at least one collapsible vane is biased by a spring means.

17. The invention as defined in claim 14 wherein said at least one collapsible vane has a dashpot damping means.

18. The invention as defined in claim 14 further comprising means for balancing said rotor.

19. The invention as defined in claim 14 further comprising means for cushioning engagement between said extended vane and said at least one collapsible vane.

20. The invention as defined in claim 14 wherein said body of fluid is water.

* * * * *